(12) United States Patent
Wang

(10) Patent No.: US 10,121,298 B2
(45) Date of Patent: Nov. 6, 2018

(54) UNLOCKING METHOD AND DEVICE APPLIED THE SAME

(71) Applicant: MediaTek Singapore Pte. Ltd., Singapore (SG)

(72) Inventor: Zhan-yong Wang, Hefei (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 19 days.

(21) Appl. No.: 14/930,961

(22) Filed: Nov. 3, 2015

(65) Prior Publication Data
US 2016/0140786 A1    May 19, 2016

(30) Foreign Application Priority Data
Nov. 18, 2014  (CN) .......................... 2014 1 0660176

(51) Int. Cl.
*G06F 3/023*     (2006.01)
*H04L 9/00*      (2006.01)
(Continued)

(52) U.S. Cl.
CPC ....... *G07C 9/00142* (2013.01); *G06F 21/316* (2013.01); *H04L 63/0846* (2013.01);
(Continued)

(58) Field of Classification Search
CPC .. G07C 2209/08; G07C 9/00142; G07C 1/32; G07C 9/00023; G07C 2009/00246; G07C 2009/00404; G07C 2009/00373; G06F 2221/2137; G06F 21/41; G06F 3/0237; G06F 3/04886; G06F 13/102; G06F 13/20; G06F 13/4081; G06F 13/4282; G06F 17/30345; G06F 21/316; G06F 21/575; G06F 21/77; G06F 21/85; G06F 2213/0042; G06F 2221/2153; G06F 3/00; G06F 3/018; G06F 3/0219; G06F 3/0235;
(Continued)

(56) References Cited

U.S. PATENT DOCUMENTS

| 4,912,692 A | * | 3/1990 | Kamens | .................... | G04C 3/14 |
| | | | | | 318/696 |
| 5,602,536 A | * | 2/1997 | Henderson | ............... | G07C 1/32 |
| | | | | | 340/5.23 |

(Continued)

FOREIGN PATENT DOCUMENTS

| CN | 101384051 A | 3/2009 |
| CN | 102169404 A | 8/2011 |

(Continued)

*Primary Examiner* — Dionne H Pendleton
(74) *Attorney, Agent, or Firm* — McClure, Qualey & Rodack, LLP

(57) ABSTRACT

An unlocking method and device utilizing the same are provided. The unlocking method is disclosed, including: in response to an input pre-unlocking operation, performing a timing operation; detecting at least one input unlocking operation; determining whether a time interval from the timing operation to the input unlocking operation is equal to a predefined interval, and if the time interval from the timing operation to the input unlocking operation is equal to the predefined interval, unlocking the device, otherwise, not unlocking the device.

14 Claims, 13 Drawing Sheets

(51) Int. Cl.
*G07C 9/00* (2006.01)
*H04W 12/06* (2009.01)
*G06F 21/31* (2013.01)
*H04L 29/06* (2006.01)

(52) U.S. Cl.
CPC ........... *H04L 63/105* (2013.01); *H04W 12/06* (2013.01); *G07C 2209/08* (2013.01)

(58) Field of Classification Search
CPC ................ G06F 3/04842; G06F 9/445; H04L 2209/043; H04L 2209/56; H04L 9/3226; H04L 63/0838; H04L 63/0853; H04L 63/0861; H04L 63/105; H04N 21/47202; H04W 12/06; H05K 5/0278; G06Q 10/0838; G06Q 20/0453; G06Q 20/065; G06Q 20/105; G06Q 20/24; G06Q 20/342; G06Q 20/349; G06Q 20/385; G06Q 20/4012; G06Q 30/016; G06Q 30/0185; G06Q 30/0633
See application file for complete search history.

(56) References Cited

U.S. PATENT DOCUMENTS

| | | | | |
|---|---|---|---|---|
| 6,715,086 | B1 * | 3/2004 | Himmel | G06F 21/316 327/263 |
| 8,830,182 | B1 * | 9/2014 | Alakuijala | G06F 3/04886 345/173 |
| 2004/0257195 | A1 * | 12/2004 | Atkinson | G07C 9/00103 340/5.2 |
| 2007/0002027 | A1 | 1/2007 | Lii et al. | |
| 2008/0109900 | A1 * | 5/2008 | Kishi | G06F 21/31 726/21 |
| 2008/0301791 | A1 * | 12/2008 | Smith | G06F 21/41 726/7 |
| 2011/0010470 | A1 * | 1/2011 | Hulbert | G06F 3/0219 710/13 |
| 2012/0103729 | A1 * | 5/2012 | Finschi | B66B 1/468 187/247 |
| 2012/0132605 | A1 * | 5/2012 | Ogawa | B66C 13/44 212/284 |
| 2014/0062903 | A1 | 3/2014 | Lee et al. | |
| 2014/0146054 | A1 | 5/2014 | Luan | |
| 2014/0267064 | A1 | 9/2014 | Lu | |
| 2018/0032149 | A1 * | 2/2018 | Molla | G06F 3/0235 |

FOREIGN PATENT DOCUMENTS

| | | |
|---|---|---|
| CN | 102629168 A | 8/2012 |
| CN | 102663311 A | 9/2012 |
| TW | I284274 B | 7/2007 |
| TW | 201137658 A | 11/2011 |
| TW | 201333805 A | 8/2013 |
| TW | 201409345 A | 3/2014 |

\* cited by examiner

UNLOCKING METHOD AND DEVICE APPLIED THE SAME

CROSS REFERENCE TO RELATED APPLICATIONS

This Application claims priority of China Application No. 201410660176.X, filed on Nov. 18, 2014, and the entirety of which is incorporated by reference herein.

BACKGROUND OF THE INVENTION

Field of the Invention

The present invention relates to mobile terminal technology, and more particularly, to an unlocking method, and a device applied the same.

Description of the Related Art

As mobile technology advances, more and more functions are implemented on mobile terminals to facilitate uses in everyday life and work of users. Consequently a large amount of private messages are stored in the mobile terminals. In order to protect the privacy of users, and to prevent the users from operating the mobile terminals incorrectly, conventional mobile terminal are equipped with a screen lock mode.

Currently, in the equipped screen lock mode of a mobile terminals, the following operating methods are used to unlock the locked screen: in a predefined scenario, a touch operation trace input by a user is compared to a predefined trace; a predefined touch trace is completed according to tips shown on a screen; or a hit event is happened on a specific position of a screen and another hit event is happened again to unlock the screen, and so on.

The conventional unlocking methods unlock devices based on touch events. Only mobile devices with touch screens may adopt the screen lock mode, thus these conventional unlocking methods may not be widely used in various applications.

BRIEF SUMMARY OF THE INVENTION

A detailed description is given in the following embodiments with reference to the accompanying drawings.

An unlocking method and a device utilizing the same are provided in the invention, disclosing a time-based unlocking scheme applicable to various apparatus.

In a preferred embodiment, the invention is directed to an unlocking method for unlocking a device, comprising: performing a timing operation in response to an input pre-unlocking operation; detecting at least one input unlocking operation; determining whether a time interval from start of the timing operation to completion of the input unlocking operation is equal to a predefined interval, and if the time interval is equal to the predefined interval, unlocking the device, otherwise, not unlocking the device.

In some embodiments, after the step of performing a timing operation in response to an input pre-unlocking operation, the unlocking method further comprises: outputting a current-time message to indicate the time interval from the start of the timing operation to the input unlocking operation.

In some embodiments, the current-time message includes a sound, a vibration, or an image; and the outputting step comprises: during the timing operation, outputting the current-time message based on a predetermined frequency.

In some embodiments, the step of outputting the current-time message based on a predetermined frequency further comprises: rotationally showing 10 numbers ranging from 0 to 9 in an ascending order starting from 0; and determining the current-time message according to the currently shown number and a time of rotations of the currently shown number.

In some embodiments, the step of outputting the current-time message based on a predetermined frequency further comprises: displaying symbols including at least two directional arrows when the timing operation is started, and controlling the at least two directional arrows highlighted rotating in a clockwise or anti-clockwise order based on the predetermined frequency during the timing operation; and determining the current-time message according to a currently highlighting directional arrow and a time of rotations of the currently highlighting directional arrow.

In some embodiments, before the step of detecting at least one input unlocking operation, the unlocking method further comprises: detecting the input pre-unlocking operation for a locked device; when the input pre-unlocking operation for the locked device is detected, initiating the timing operation; determining whether the pre-unlocking operation has been lasting for a predefined period; and if the pre-unlocking operation has been lasting for the predefined period, performing another timing operation.

In some embodiments, the at least one input unlocking operation comprises an unlocking password including N numbers of sequentially configured sub-passwords, and each sub-password indicates a predefined interval; the determining step further comprises: determining whether a time interval between a current unlocking operation and a previous unlocking operation is equal to a corresponding predefined interval which is indicated by a corresponding sub-password; if the time interval between the current unlocking operation and the previous unlocking operation is equal to the corresponding predefined interval, confirming that a sub-password has been entered; determining whether the N numbers of sub-passwords have been entered; when the N numbers of sub-passwords have been entered, unlocking the device; when the N numbers of sub-passwords have not been completely entered, performing another timing operation after one sub-password has been entered and continuing detecting the unlocking operation; and repeating the above steps until the N numbers of sub-passwords have been entered.

In some embodiments, the unlocking operation comprises at least one of a touch operation, a voice input, a keypad input and a fingerprint input, and the pre-unlocking operation comprises at least one of a touch operation, a voice input, a keypad input and a fingerprint input.

In some embodiments, the unlocking operation is different from the pre-unlocking operation.

In a preferred embodiment, the invention is directed to an unlocking method for unlocking a device, comprising: entering an unlocking mode in response to an input pre-unlocking operation; detecting at least one input unlocking operation; determining whether an lasting time of the at least one input unlocking operation is equal to a predefined interval, and if the lasting time is equal to the predefined interval, unlocking the device, otherwise, not unlocking the device.

In some embodiments, after the step of detecting at least one input unlocking operation, the unlocking method further comprises: initiating the timing operation when detect the at least one input unlocking operation, and outputting a timing message generated in the timing operation to indicate the lasting time of the unlocking operation.

In some embodiments, the at least one input unlocking operation comprises an unlocking password including N numbers of sequentially configured sub-passwords, and each sub-password corresponds to a predefined interval; the determining step comprises: determining whether each of the lasting time of the at least one input unlocking operation is equal to each of predefined intervals which is indicated by a corresponding sub-password; if each of the lasting time of the at least one input unlocking operation is equal to each of predefined intervals; confirming that a corresponding sub-password has been entered; determining whether the N numbers of sub-passwords have been entered; when the N numbers of sub-passwords have been entered, unlocking the device; when the N numbers of sub-passwords have not been completely entered, performing another timing operation after one sub-password has been entered and continuing detecting the unlocking operation; and repeating the above steps until the N numbers of sub-passwords have been entered.

In a preferred embodiment, the invention is directed to a device, comprising: a timing unit, in response to an input pre-unlocking operation, configured to perform a timing operation; a detection unit, configured to detect at least one input unlocking operation; an unlocking unit, configured to determine whether a time interval start of from the timing operation to completion of the input unlocking operation is equal to a predefined interval, and if the time interval is equal to the predefined interval, unlock the device.

In some embodiments, the device further comprises: a timing message output unit, configured to output a current-time message; a speaker, controlled by the timing message output unit, output a sound according to the predefined frequency to determine the current-time message is performing the timing operation.

In a preferred embodiment, the invention is directed to a device, comprising: a detection unit, configured to enter an unlocking mode in response to an input pre-unlocking operation, and detect an input unlocking operation; a timing unit, configured to perform a timing operation to an lasting time of the input unlocking operation detected by the detection unit; and an unlocking unit, configured to determine whether the lasting time of the input unlocking operation is equal to a predefined interval, and if the lasting time of the input unlocking operation is equal to the predefined interval, unlocking the device.

In some embodiments, the device further comprises a timing message output unit, configured to output a current-time message; a speaker, controlled by the timing message output unit, output a sound according to the predefined frequency to determine the current-time message is performing the timing operation.

The advantages of the embodiments of the invention include: the unlocking device performs a timing operation upon receiving an input pre-unlocking operation, determines whether the time interval of time from when the timing operation starts to when the unlocking operation is entered is equal to a predefined interval (password) upon detecting the entered unlocking operation, or determines the unlocking operation has been ongoing for a predefined interval and unlocking the device when they are the same. The unlocking device provides a time-based unlocking scheme by configuring the unlocking password as a time interval, thus the password is not limited to the availability of a display, and may be applied to various apparatuses and in various scenarios.

BRIEF DESCRIPTION OF THE DROWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The following embodiments and FIGs. detail the technology context, structure features, and objectives of the invention.

Figure 1:
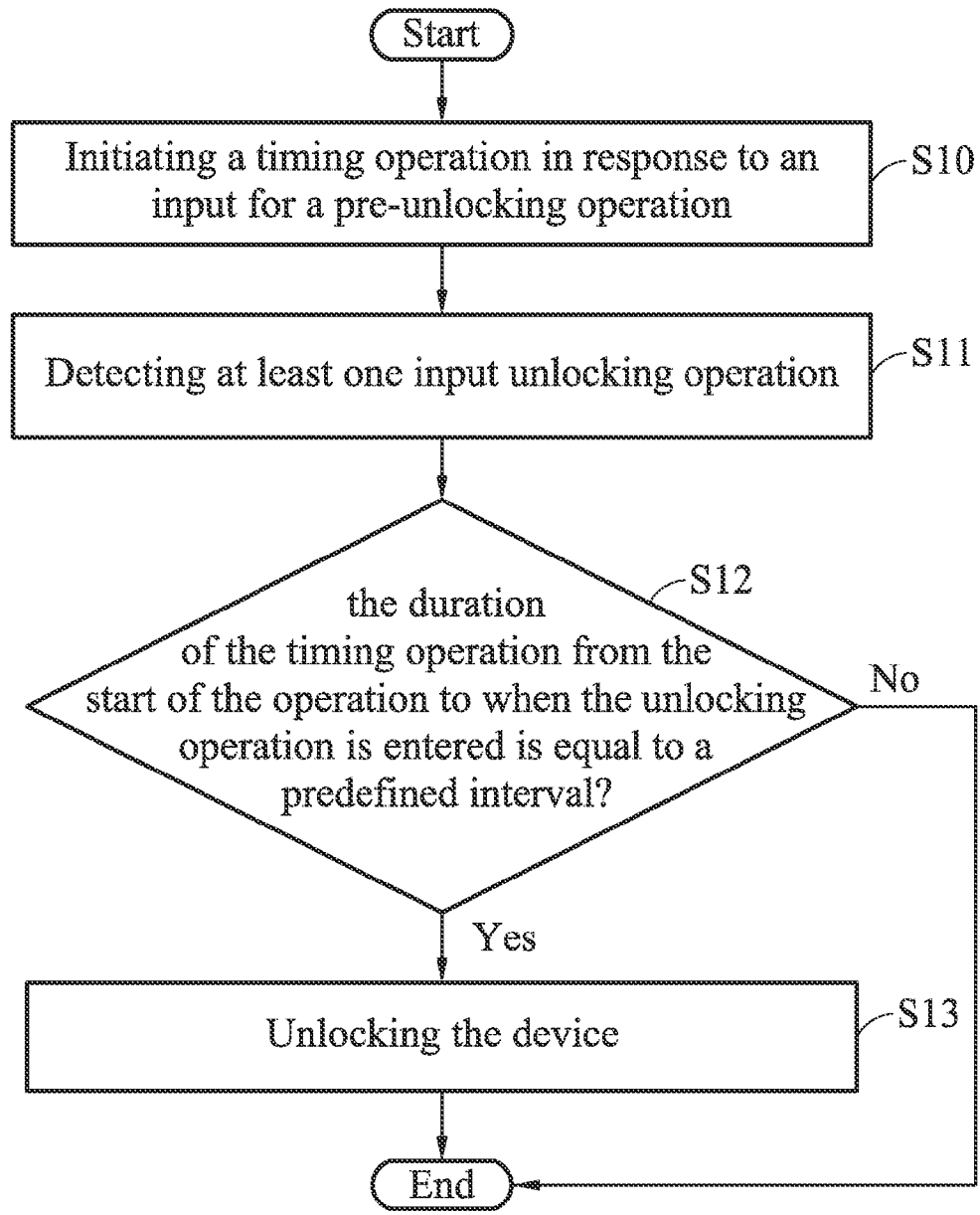
FIG. 1 is a flowchart of an unlocking method according to a first embodiment of the invention.

Please refer to FIG. 1, showing a flowchart of an unlocking method according to a first embodiment of the invention. The unlocking method includes the following steps:

Step S10, initiating a timing operation in response to an input for a pre-unlocking operation.

The pre-unlocking operation is a predefined operation input into a locked device, e.g., triggering a start button on the device.

Step S11, detecting at least one input unlocking operation.

The at least one input unlocking operation may be any user input operation, or a predefined operation.

Step S12, determining whether a time interval from start of the timing operation to completion of the input unlocking operation is equal to a predefined interval, i.e. determining whether the duration from the start of the timing operation to completion of the input unlocking operation is equal to a predefined interval. If so, the unlocking method goes to Step S13, otherwise, the device will not be unlocked and the unlocking method is ended. The time interval is indicated by a password pre-configured by the user, wherein the password is consist of N numbers, and each of the number indicates a corresponding time interval, for example, the time interval is 2 second when the corresponding sub-password is 2.

Step S13, unlocking the device.

Figure 2:
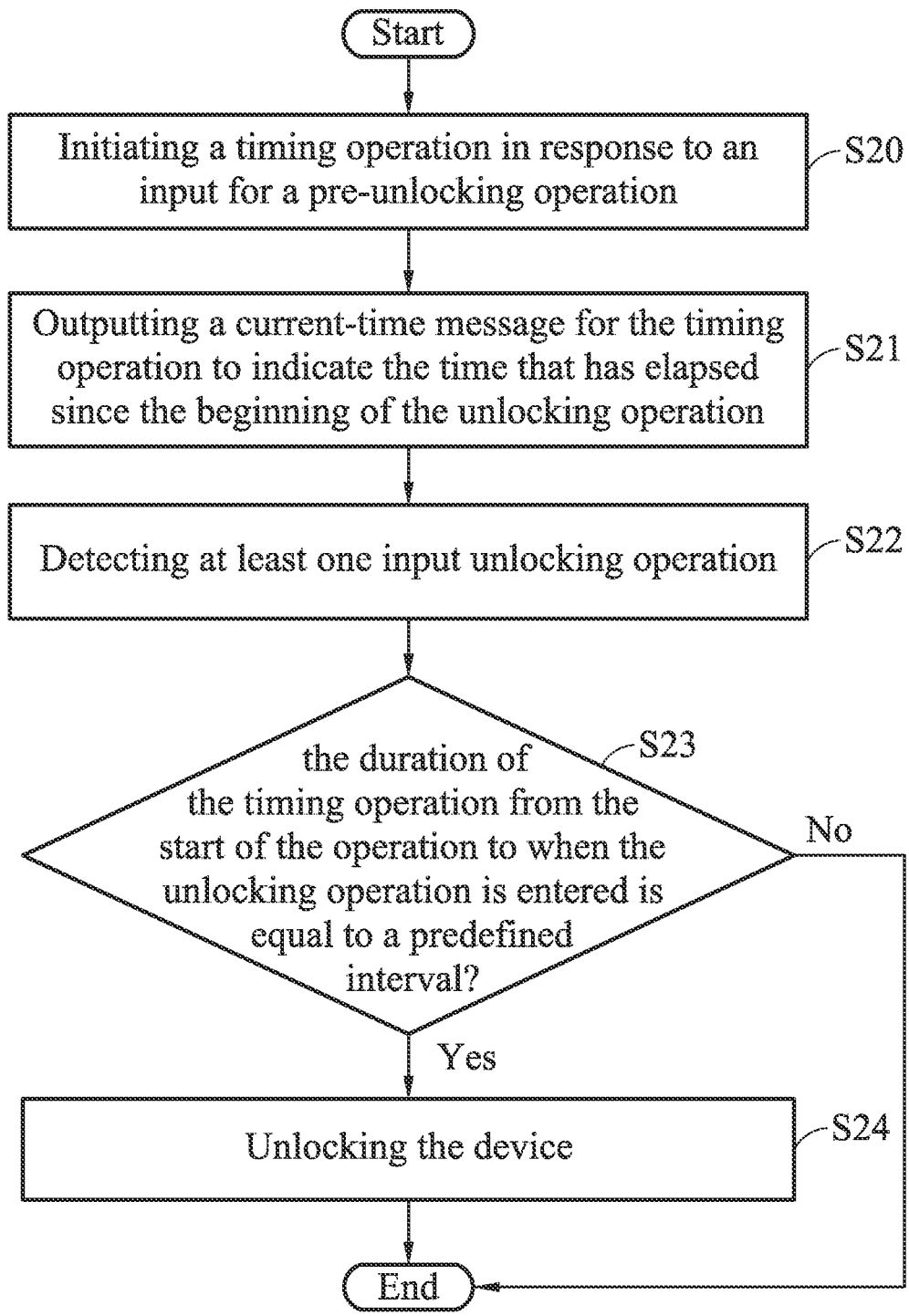
FIG. 2 is a flowchart of an unlocking method according to a second embodiment of the invention.

Please refer to FIG. 2, illustrating a flowchart of an unlocking method according to a second embodiment of the invention. The unlocking method includes the following steps:

Step S20, initiating a timing operation in response to an input for a pre-unlocking operation.

Step S21, outputting a current-time message for the timing operation to indicate the time that has elapsed since the beginning of the unlocking operation.

The time message may be a real physical time or time information represented by the output message content, details of which are provided as follows.

In the embodiments of the invention, the time message may be a sound, a vibration, or an image. The step of outputting a current-time message for the timing operation may be implemented by outputting the current-time message according to a predefined frequency during the timing operation, wherein the predefined frequency may be defaulted by the device or predefined by the user. For example, a sound may be output every 1 second, and the user may determine the current time based on the number of times that the sound is outputted. More specifically, the user may determine the current time is 5 s for the sound is outputted 5 times. The time message may use vibration or image in place of the sound based on the same principle.

Figure 3:
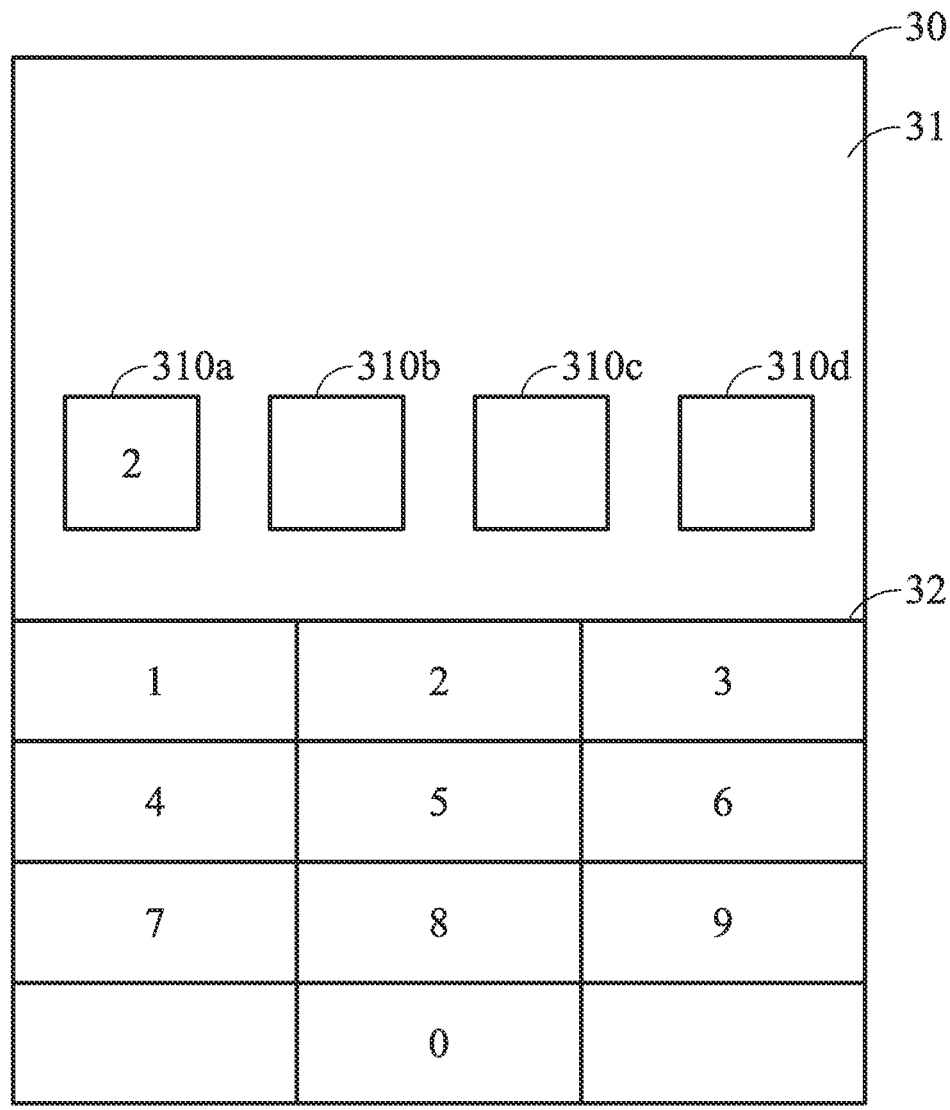
FIG. 3 is a diagram of a user interface outputting a current-time message according to an embodiment of the invention.

Please refer to FIG. 3, after a previous predefined time has expired and another timing operation is initiated, the device provides an unlocking interface 30 which contains a sub-password input zone 31 and a number display zone 32. The sub-password input zone 31 includes 4 sub-password input blocks 310a, 310b, 310c and 310d, and the number display zone 32 may show 10 numbers ranged from 0 to 9. The step of outputting a current-time message according to a predefined frequency during the timing operation may be implemented by displaying the 10 numbers in ascending order during the timing operation, wherein the current-time message is presented by the currently displayed number and the number of rotations the currently displayed number. For example, in a case of displaying the next ascending number every 1 second from 0 upwards during the timing operation, the user may determine the current time as 16 seconds when the currently displayed number is 6 and the number 6 has been shown twice.

Figure 4:
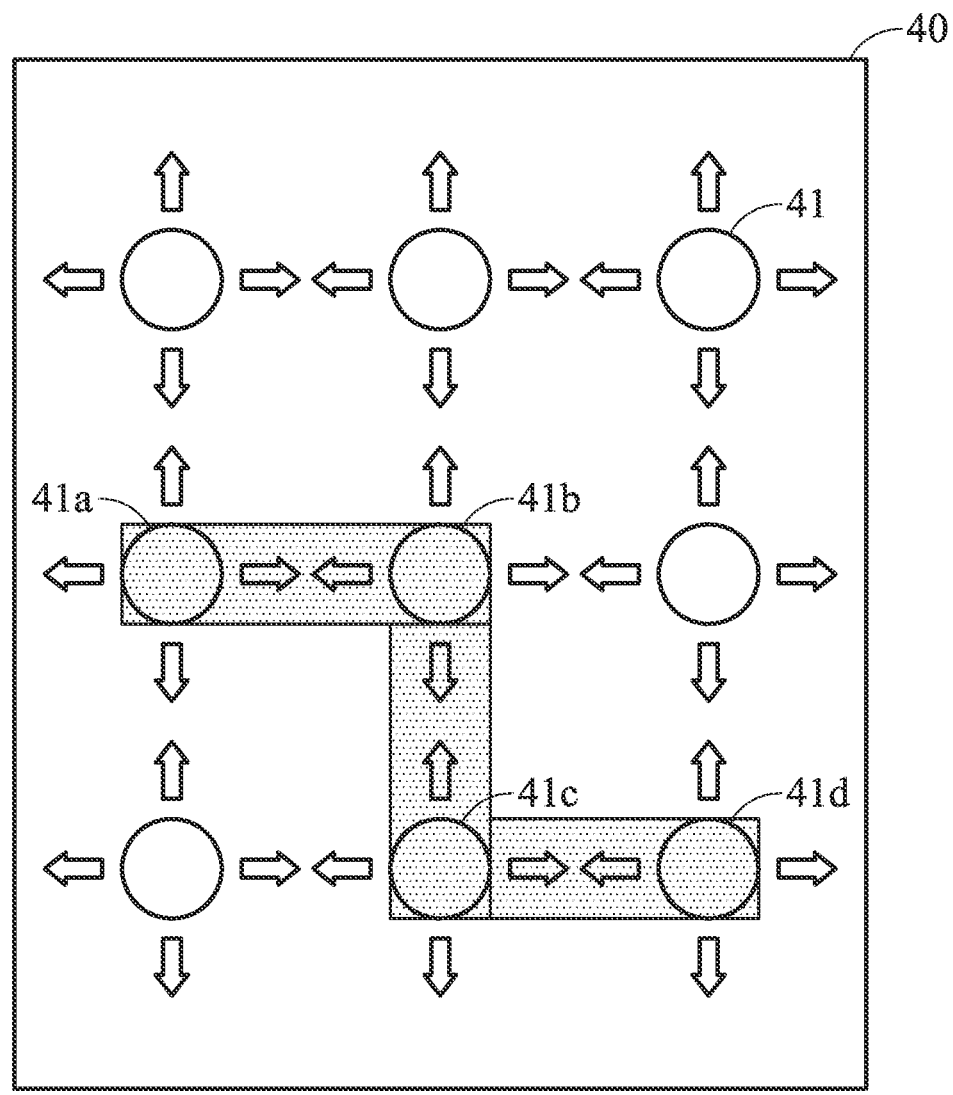
FIG. 4 is a diagram of a user interface outputting a current-time message according to another embodiment of the invention.

Please refer to FIG. 4, FIG. 4 shows an unlocking interface 40. The unlocking interface 40 shows multiple symbols 41, which are arranged as a matrix, such as a 3×3 matrix, and each symbol 41 includes up, down, left and right arrows. The step of outputting a current-time message according to a predefined frequency during the timing operation may be implemented by displaying the symbols including at least two directional arrows when the timing operation is started, showing the directional arrows of a symbol by highlighting corresponding directional arrow in a clockwise or anti-clockwise order according to the predefined frequency, and determining the current-time message according to the currently highlighting directional arrow and the number of rotations of the currently highlighting directional arrow. For example, in a case of displaying the symbols including four directional arrows by highlighting corresponding directional arrow alternately every second in a clockwise order, when the "left arrow" is currently being shown and the "left arrow" has been shown twice, the current-time message is 8 seconds. The highlighting arrow symbol may be represented by a lighter, brighter indication or a darker indication.

Step S22, detecting at least one input unlocking operation.

In the embodiment of the invention, the unlocking operation is different from the pre-unlocking operation, and the unlocking operation and the pre-unlocking operation may be a touch operation, a voice input, a keypad input, or a fingerprint input, respectively.

Step S23, determining whether a time interval from start of the timing operation to completion of the input unlocking operation is equal to a predefined interval, i.e. determining whether the duration from the start of the timing operation to completion of the input unlocking operation is equal to a predefined interval. If so, the unlocking method goes to Step S24, otherwise, the device will not be unlocked and the unlocking method is stopped.

The predetermined interval is indicated by a password that pre-configured by the user.

Step S24, unlocking the device.

Figure 5:
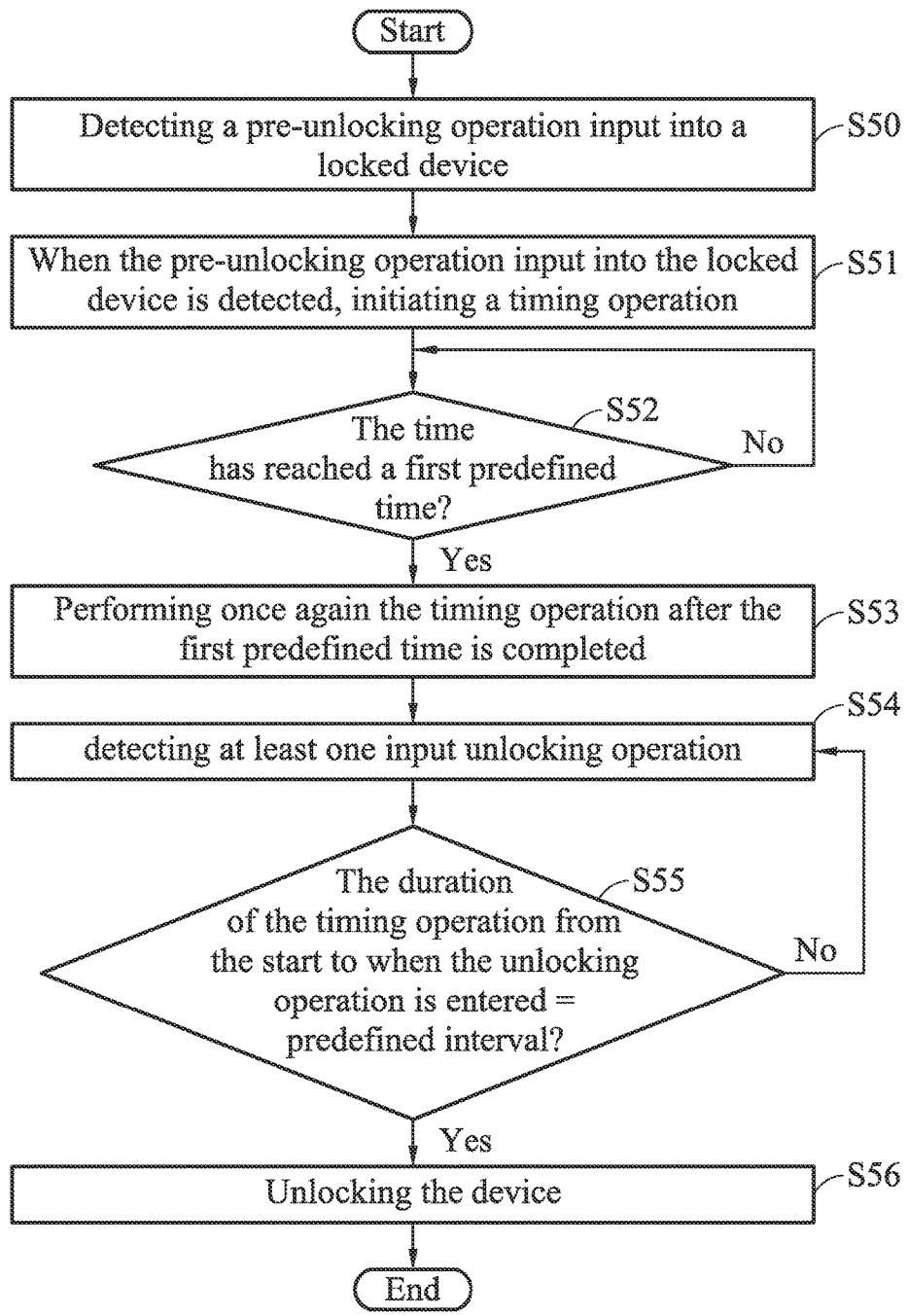
FIG. 5 is a flowchart of an unlocking method according to a third embodiment of the invention.

Please refer to FIG. 5, illustrating a flowchart of an unlocking method according to a third embodiment of the invention. The unlocking method includes the following steps:

Step S50, detecting a pre-unlocking operation that inputted into a locked device.

Step S51, when the pre-unlocking operation that inputted into the locked device is detected, initiating a timing operation.

When the device is locked, it will not respond to any operation other than the pre-unlocking operation inputted by the user. For instance, when the device is locked, a background wallpaper or a current-time message will be shown on the screen; after the user enters a pre-locking operation such as pressing a power-on button on the device, it may be identified that the operation inputted by the user to the device is the pre-locking operation, and a timing operation will be initiated.

Step S52, determining whether the duration of timing operation has reached a previous predefined time. If so, the unlocking method will enter Step S53, otherwise, it will continue to perform Step S52.

The previous predefined time is the duration from when the device detects the pre-unlocking operation input by the user to when the user stops entering the pre-unlocking operation.

Step S53, performing the timing operation again after the previous predefined time is completed.

Moreover, a current-time message is output to the user while performing the timing operation again to indicate the time of the unlocking operation input by the user.

The timing message may be a real physical time or a time information represented by the output message content.

Step S54, detecting at least one input unlocking operation.

Step S55, determining whether the duration from the start of the timing operation to completion of the input unlocking operation is equal to a predefined interval. If so, the unlocking method goes to Step S56, otherwise, it will return to Step S54.

Step S56, unlocking the device.

Figure 6:
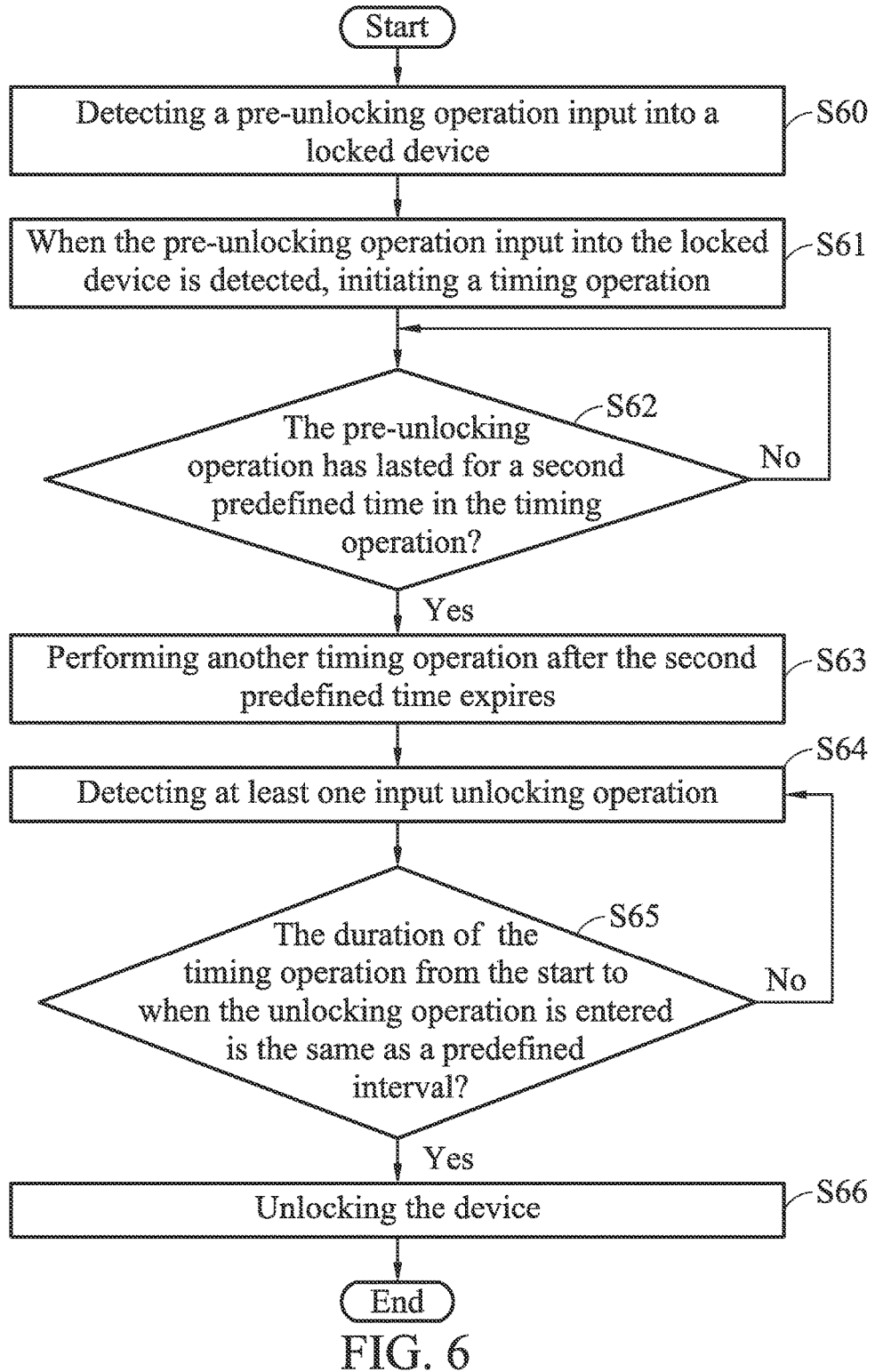
FIG. 6 is a flowchart of an unlocking method according to a fourth embodiment of the invention.

Please refer to FIG. 6, illustrating a flowchart of an unlocking method according to a fourth embodiment of the invention. The unlocking method includes the following steps:

Step S60, detecting a pre-unlocking operation that inputted into a locked device.

Step S61, initiating a timing operation when the pre-unlocking operation that inputted into a locked device is detected.

Step S62, determining whether the pre-unlocking operation has lasted for a second predefined time during the timing operation. If so, the unlocking method will perform Step S63, otherwise, it will continue to perform Step S62.

Step S63, if the pre-unlocking operation has lasted for the second predefined time during the timing operation, then performing another timing operation after the second predefined time expires.

The user may continue performing the pre-unlocking operation in the second predefined time by, for example, applying a long press to a power-on button of the device, and then stopping the pre-unlocking operation after the second predefined time is expired by, for example, releasing the power-on button of the device.

Further, a current-time message is output to the user while performing the timing operation again to indicate the time of the unlocking operation that inputted by the user.

The timing message may be a real physical time or a time information represented by the output message content.

Step S64, detecting at least one input unlocking operation.

Step S65, determining whether the duration of the timing operation from the start of the operation to when the unlocking operation is entered is equal to a predefined interval. If so, the unlocking method goes to Step S66, otherwise, it will return to Step S64.

Step S66, unlocking the device.

Figure 7:
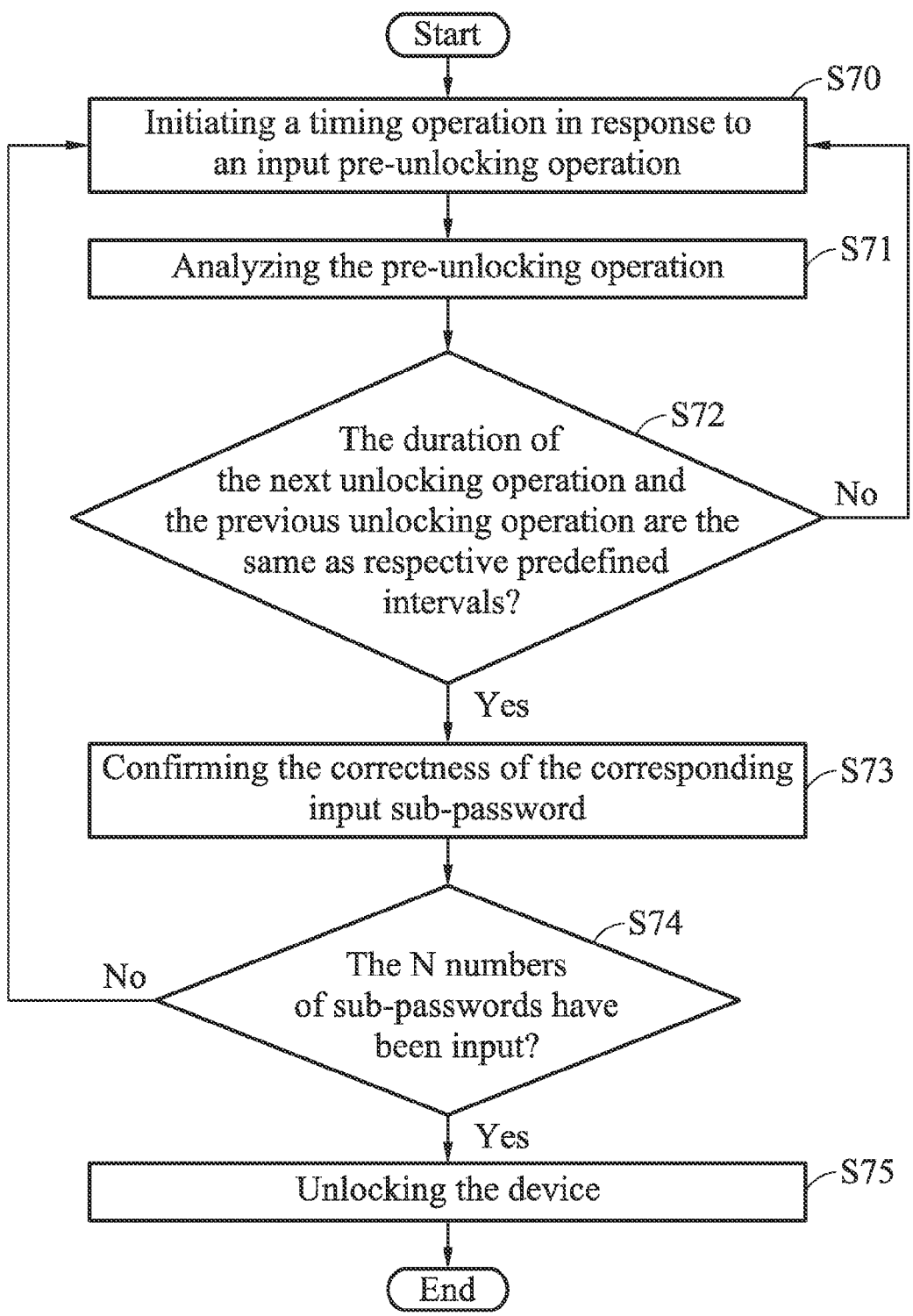
FIG. 7 is a flowchart of an unlocking method according to a fifth embodiment of the invention.

Please refer to FIG. 7, illustrating a flowchart of an unlocking method according to a fifth embodiment of the invention. The unlocking method includes the following steps:

Step S70, initiating a timing operation in response to an input pre-unlocking operation.

Step S71, detecting the input pre-unlocking operation.

Step S72, determining whether the duration of the next unlocking operation and the duration of the previous unlocking operation are equal to respective predefined interval. If so, the unlocking method will perform Step S73, otherwise, it will return to Step S70.

The password for unlocking the device includes N numbers of sub-passwords which are defined in turn, and each sub-password corresponds to a predefined time interval.

Step S73, confirming the corresponding input sub-password.

Step S74, determining whether the N numbers of sub-passwords have been input, if so, the unlocking method will perform Step S75, otherwise, it will return to Step S70.

After it has been confirmed that m numbers of sub-passwords have been input in Steps S70 through S73, the unlocking method will return to Step S70 to perform the timing operation once again without the need for re-entering the pre-unlocking operation by the user, wherein m<N, and both m and N are natural numbers.

Step S75, unlocking the device and completing the unlocking method.

Since the unlocking password of the device includes N numbers of sub-passwords, each time the user completes entering a sub-password according to Steps S70 through S73, it is required to return to Step S70 to enter a next sub-password, until the N numbers of sub-passwords are entered completely. The predefined interval for entering each password in Step S72 may be different from or equal to that for the other passwords, and may be configured based on the corresponding sub-password.

In FIG. 3, an example of how the unlocking password of the device includes 4 sub-passwords is provided to illustrate the operation of the present embodiment. The predefined intervals for the 4 sub-passwords of the unlocking password are configured as 2s, 11s, 12s, and 4s, respectively. When the device is waiting to be unlocked, the user is required to complete a corresponding operation by entering the corresponding sub-passwords into the sub-password input blocks 310a, 310b, 310c, and 310d. Specifically, the sub-password input block 310a rotationally shows a next number every 1 second starting from number 0, thereby outputting the current-time message of the timing operation to the user, i.e., a number 0 is shown in the first second and a number 2 is shown in the second in the sub-password input block 310a. Since the user pre-configures the first sub-password is entered at the second, the user consequently performs a corresponding operation when the sub-password input block 310a shows the number 2, in order to complete the entry of the first sub-password. The operation may be performed based on the number displayed in the sub-password input block 310a or a predetermined zone on the unlocking interface 30 or the predetermined keypad on the device. The time will be recounted after the first sub-password is entered, and then the sub-password input block 310b rotationally shows the next number every 1 second. Since the unlocking interface 30 only shows 10 numbers ranging from 0 to 9, the 10 numbers from 0 to 9 are rotationally displayed on the sub-password input block 310b, starting from 0. When the user sees the number 0 on the sub-password input block 310b twice, he or she knows that the elapsed time is 11 seconds, and enters a corresponding operation to the device to complete the entry of the second sub-password. In this regard, the number 0 shown on the sub-password input block 310b does not indicate that the sub-password is the number 0. Rather, it represents the current-time message of 11 seconds by rotationally displaying the 10 numbers from 0 to 9, and the corresponding sub-password is in fact 11. Similarly, other sub-passwords may be entered according to the preceding disclosure, and the device is unlocked after all sub-passwords have been entered.

The number to be shown every predefined interval may not only be rotationally displayed in the sub-password input block, but also may be highlighted in the number display zone 32, wherein the number is from 0 to 9. Furthermore, the current-time messages represented by numbers are not limited to the two methods outlined in the preceding section.

In FIG. 4, an example of the unlocking password of the device including a trace formed by 4 symbols is provided to illustrate operation of the present embodiment. The 4 symbols forming the trace include symbols 41a, 41b, 41c and 41d, and the sub-passwords forming the unlocking password are configured as 2, 7, 6 , and 6, respectively, which means the time interval corresponding to the respective sub-password is 2s, 7s, 6s, and 6s, respectively. The user is required to complete a corresponding operation by forming the trace via the symbols 41a, 41b, 41c and 41d, thereby completing the entry of the unlocking password. Specifically, the 4 directional arrows of the symbol 41 a are highlighted in a clockwise order according to the predefined interval, starting from an "up" arrow, to output the current-time message to the user. That is, the "up" arrow of the symbol 41a is highlighted in the first second, the "right" arrow of the symbol 41a is highlighted in the second second, and so on. Since the first sub-password pre-configured by the user is 2, which means the time interval corresponding to the first sub-password is 2s, thus an operation is entered into the device when the "right" arrow is highlighted in the first time. The operation may not only apply to the symbol 41a, but also a predetermined zone on the unlocking interface 40 or the predetermined keypad on the device. After the entry of the first sub-password is completed, the right symbol 41b is used for entering the second sub-password. Accordingly, the 4 directional arrows of the symbol are highlighted in a clockwise order in turn. Since the second sub-password pre-configured by the user is 7, which means the time interval corresponding to the second sub-password is 7s, thus the 4 directional arrows of the symbol 41b are rotationally highlighted from the "up" arrow (4 seconds in time), and then are highlighted again sequentially from the "up" arrow until the "down" arrow (another 3 seconds in time). When the user sees the "down" arrow for the second time, he or she knows that the elapsed time is 7 seconds, and enters an operation to the device to complete the entry of the second sub-password. In this manner, other sub-passwords are entered. When all sub-passwords are entered, the device will be unlocked. In this regard, the trace shown on the unlocking interface is not the unlocking password, rather, the trace is formed by the location indication of the directional arrows of the corresponding symbol when the operation is entered into the device in the predefined interval.

Figure 8:
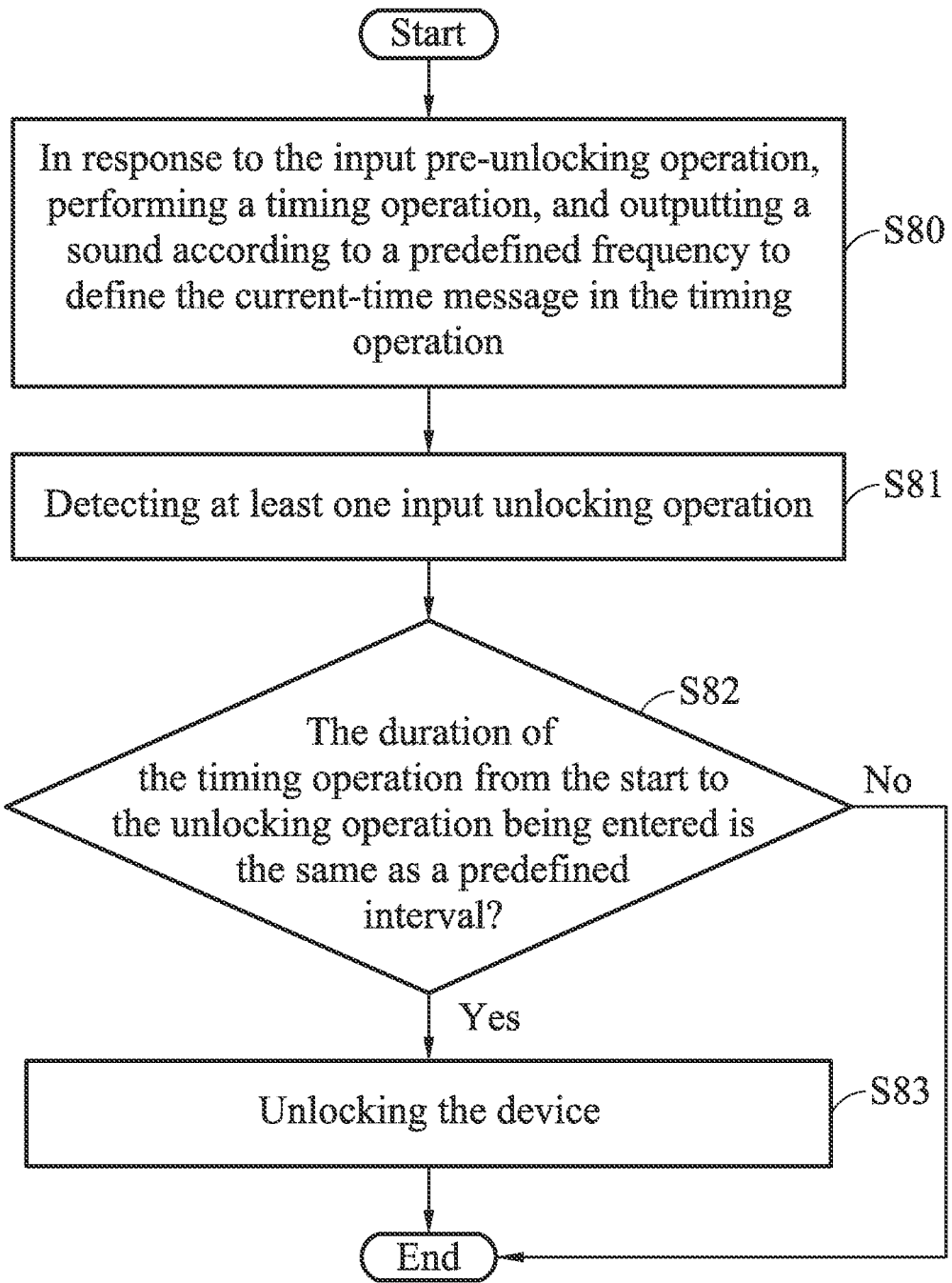
FIG. 8 is a flowchart of an unlocking method according to a sixth embodiment of the invention.

Please refer to FIG. 8, showing a flowchart of an unlocking method according to a sixth embodiment of the invention. The unlocking method includes the following steps:

Step S80, in response to the input pre-unlocking operation, performing a timing operation, and outputting a sound according to a predefined frequency to define the current-time message during the timing operation.

The current-time message may be a sound or a vibration.

When the device is a pair of smart goggles, a smart watch, or another wearable electronic device, which does not include a display or includes a limited size display to display the unlocking interface and the unlocking passwords, the current-time message output from the device to the user may be configured as a sound, a vibration, or other form that does not require a display.

Step S81, detecting at least one input unlocking operation.

The unlocking operation is entered by the user according to the output current-time message, and the operation may include hitting on a specific position of a device configuration sensor of the device.

Step S82, determining whether the duration of the timing operation from the start of the operation to when the unlocking operation being entered is equal to a predefined interval. If so, the unlocking method goes to Step S83, otherwise, the device will not be unlocked and the unlocking method is stopped.

Step S83, unlocking the device.

For example, the unlocking password of the wearable device is configured as 4s, 6s, and 12s. Specifically, the device performs a timing operation in response to the input pre-unlocking operation entered by the user, outputs a vibration according to a predefined frequency (a time interval of 1 second) during the timing operation. The user enters an operation (hitting the specific position of the device configuration sensor) when the vibrations are output for four times to complete the input of the first sub-password, and enters the second and third sub-passwords accordingly, thereby performing the unlocking operation to the wearable device.

Moreover, in the embodiment, the steps of detecting the unlocking operation and determining whether the duration for the timing operation from the start of the operation to entry to the unlocking operation is equal to the predefined interval may be realized by: stopping the timing operation when the unlocking operation inputted by the user is detected, and recording the duration of the timing operation from the start of the operation to when the unlocking operation is entered to determine whether the duration is equal to the predefined interval.

Figure 9:
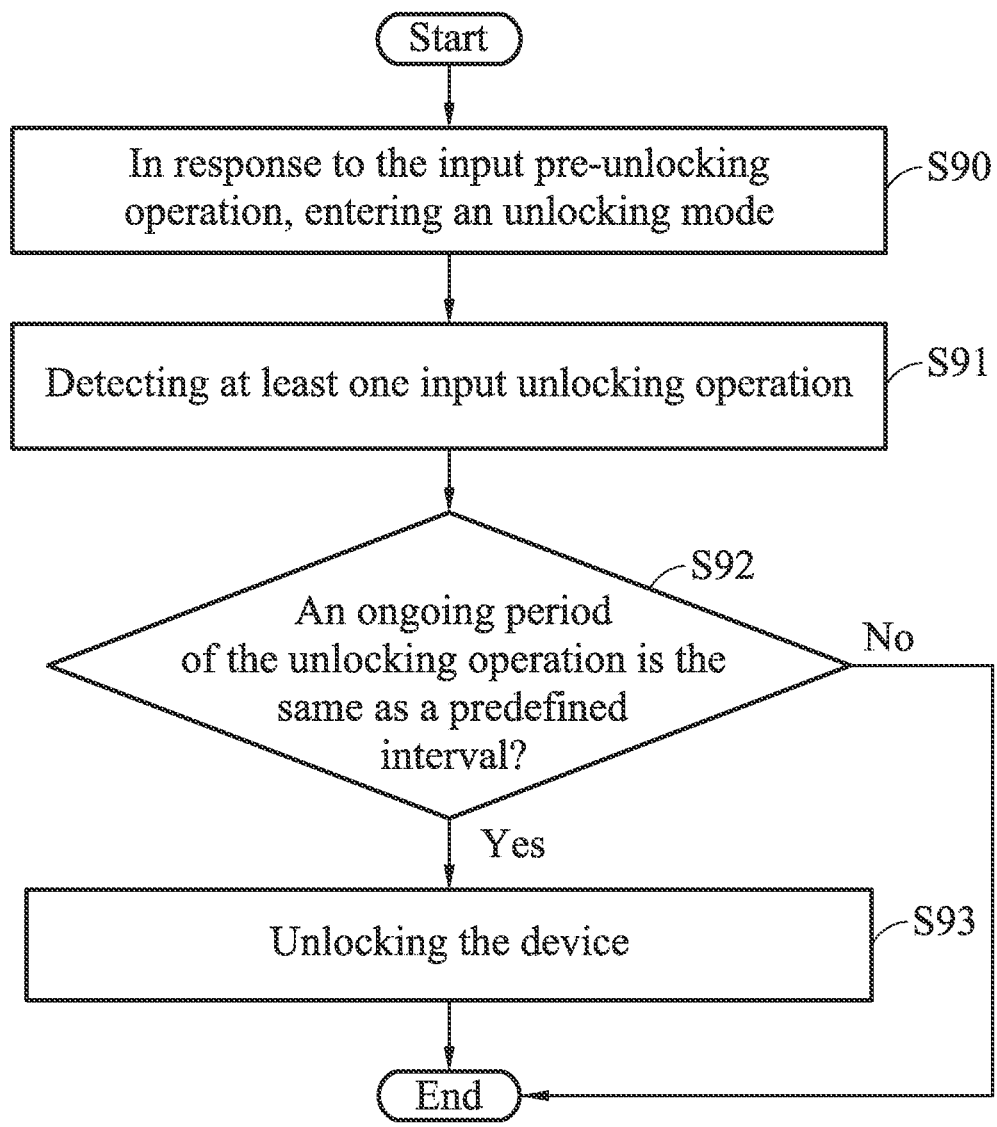
FIG. 9 is a flowchart of an unlocking method according to a seventh embodiment of the invention.

Please refer to FIG. 9, showing a flowchart of an unlocking method according to a seventh embodiment of the invention. The unlocking method includes the following steps:

Step S90, in response to the input pre-unlocking operation, entering an unlocking mode.

The unlocking mode is a state in which a locked device is activated upon receiving the pre-unlocking operation and waiting for an unlocking password to be entered.

Step S91, detecting the input unlocking operation.

The unlocking operation is different from the pre-unlocking operation.

Step S92, determining whether an ongoing period of the unlocking operation is equal to a predefined interval.

The predefined interval is a password predefined by the user.

Step S93, when the ongoing period of the unlocking operation is equal to the predefined interval, unlocking the device, otherwise, still locking the device.

In the embodiment, when the device enters the unlocking mode, the step of detecting the input unlocking operation includes: starting the timing operation upon detecting the unlocking operation inputted by the user, and outputting a timing message to the user during the timing operation to indicate the ongoing time of the unlocking operation.

The timing message may be the real time, or may be a time information represented by the context of the output message, e.g., a sound, a vibration or an image outputted according to a predefined frequency.

Figure 10:
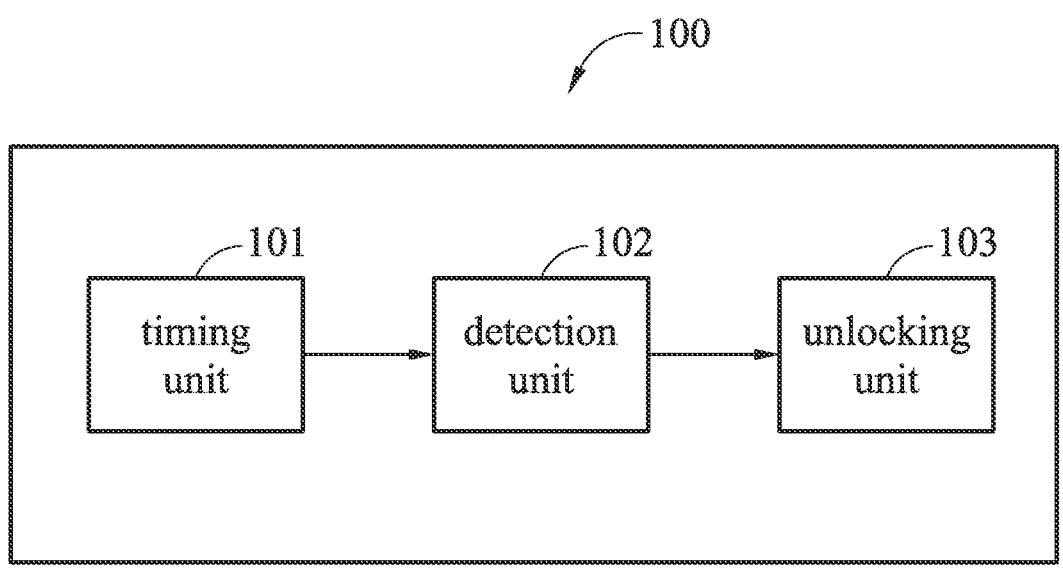
FIG. 10 is a block diagram of an unlocking device according to a first embodiment of the invention.

Please refer to FIG. 10, showing a block diagram of an unlocking device according to a first embodiment of the invention. The device 100 includes a timing unit 101, a detection unit 102, and an unlocking unit 103.

The timing unit 101 is configured to perform a timing operation in response to the input pre-unlocking operation. The pre-unlocking operation is a predefined operation entered into an locked device, e.g., triggering a power-up button of the device.

The detection unit 102 is configured to detect the input unlocking operation. The input unlocking operation may be any operation entered by the user, or a predefined operation. The unlocking operation is different from the pre-unlocking operation, and each of the unlocking operation and the pre-unlocking operation is one of a touch operation, a voice input, a keypad input, and a fingerprint input.

The unlocking unit 103 is configured to determine whether duration for the timing operation from the start of the operation to when the unlocking operation is entered is equal to a predefined interval, and to unlock the device when the duration and the predefined interval are the same.

The predefined interval is indicated by a password predefined by the user.

Figure 11:
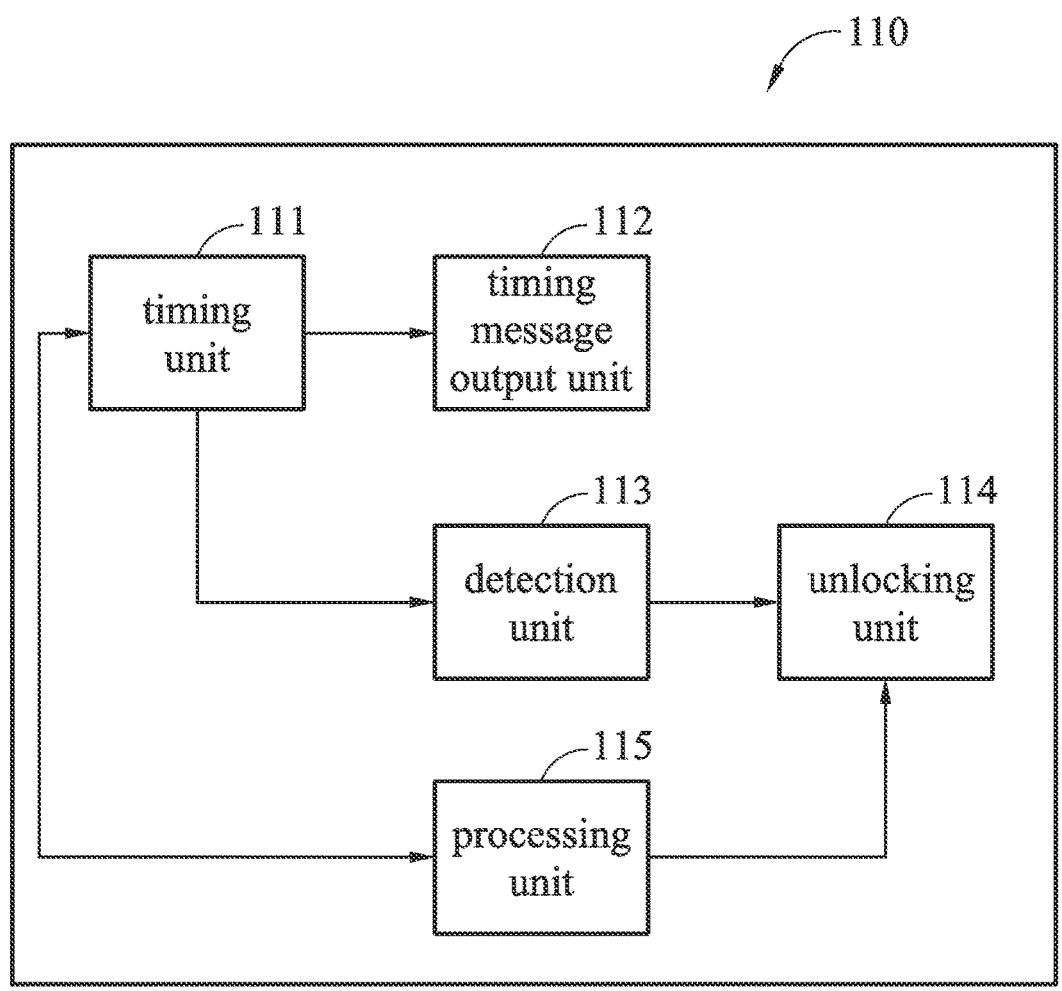
FIG. 11 is a block diagram of an unlocking device according to a second embodiment of the invention.

Please refer to FIG. 11, showing a block diagram of an unlocking device according to a second embodiment of the invention. The device 100 includes a timing unit 111, a timing message output unit 112, a detection unit 113, an unlocking unit 114, and a processing unit 115.

The detection unit 113 is configured to detect a pre-unlocking operation for the locked device. The pre-unlocking operation is a predefined operation entered into the locked device, e.g., triggering a power-up button of the device.

The timing unit 111 is configured to perform a timing operation when the detection unit 113 detects the pre-unlocking operation for the locked device.

The processing unit 115 is configured to determine whether the time counted by the timing unit 111 has already reached a first predetermined time, and when time has reached the first predetermined time, the timing unit 111 is triggered to perform another timing operation.

The timing message output unit 112 is configured to output the current-time message outputted by the timing unit 111 in another timing operation, The time message may be a real physical time or a time information represented by the input message content, details for which are provided as follows.

In the embodiments of the invention, the time message may be a sound, a vibration, or an image. The timing message output unit 112 outputs the current-time message according to a predefined frequency during the timing unit 111 performs another timing operation, wherein the predefined frequency may be defaulted by the device system or predefined by the user. For example, a sound is output every 1 second, and the user may determine the current time is 5 seconds based on the sound is repeated 5 times. The time message may adopt the vibration and image in place of the sound based on the same principle.

As illustrated in FIG. 3, the device provides an unlocking interface 30 which contains a sub-password input zone 31 and a number display zone 32. The sub-password input zone 31 includes 4 sub-password input block 310a, 310b, 310c and 310d, and the number display zone 32 may show 10 numbers ranged from 0 to 9. The step of outputting a current-time message according to a predefined frequency during the timing operation may be implemented by rotationally displaying the 10 numbers from 0 according to a predefined interval to indicate the current-time message according to the currently displayed number and the number of rotations of the currently displayed number. For example, a user may determine the current time as 16 seconds when the currently displayed number is 6 and the number 6 has been shown twice.

Please refer to FIG. 4, FIG. 4 shows that the device provides the unlocking interface 40, the unlocking interface 40 shows multiple symbols 41 which are arranged as a matrix such as a 3×3 matrix, and each symbol 41 includes up, down, left and right arrows. The timing message output unit 112 outputs the current-time message output according to a predetermined frequency when the timing unit 111 is performing the timing operation. In particular, a symbol including at least two directional arrows is displayed when the timing operation starts, and the at least two directional arrows of the symbol is highlighted alternately according to the predefined frequency during the timing operation, whereby outputting the current-time message to the user. For example, the symbols including four directional arrows are displayed alternately in a clockwise order beginning from the "up arrow" by highlighting a directional arrow every 1 second. When the "left arrow" is currently being shown and the "left arrow" has been shown twice, the current-time message is 8 seconds. The highlighting arrow symbol may be represented by a lighter, brighter indication or a darker indication.

The detection unit 113 is further configured to detect an input unlocking operation.

The unlocking operation may be any user input operation, or a predefined operation.

The unlocking unit 114 is configured to determine whether a duration is equal to the predefined interval, and unlock the device when they are the same, wherein the duration is from when the timing unit 111 starts another timing operation till when the timing message output unit 112 detects the input unlocking operation.

The predefined interval is indicated by a password predefined by the user.

In another implementation, the processing unit 115 determines whether the pre-unlocking operation lasts for a second predetermined time during the timing operation. If the pre-unlocking operation lasts for the second predetermined time during the timing operation, the timing unit 11 performs another timing operation when the second predetermined time expires and the timing message output unit 112 outputs the current-time message.

Moreover, when the unlocking password of the device includes N sub-passwords that are sequentially configured, each sub-password corresponds to a predefined interval. When the unlocking unit 114 consecutively determines the duration for each unlocking operation is equal to each predefined interval, the corresponding input sub-password is inputted. The processing unit 115 may further determine whether the N sub-passwords have been entered. If the N sub-passwords have been entered, the unlocking unit 114 may unlock the device. Otherwise, the process of entering the sub-password will continue repeatedly until the processing unit 115 determines that the N sub-passwords have been entered.

Figure 12:
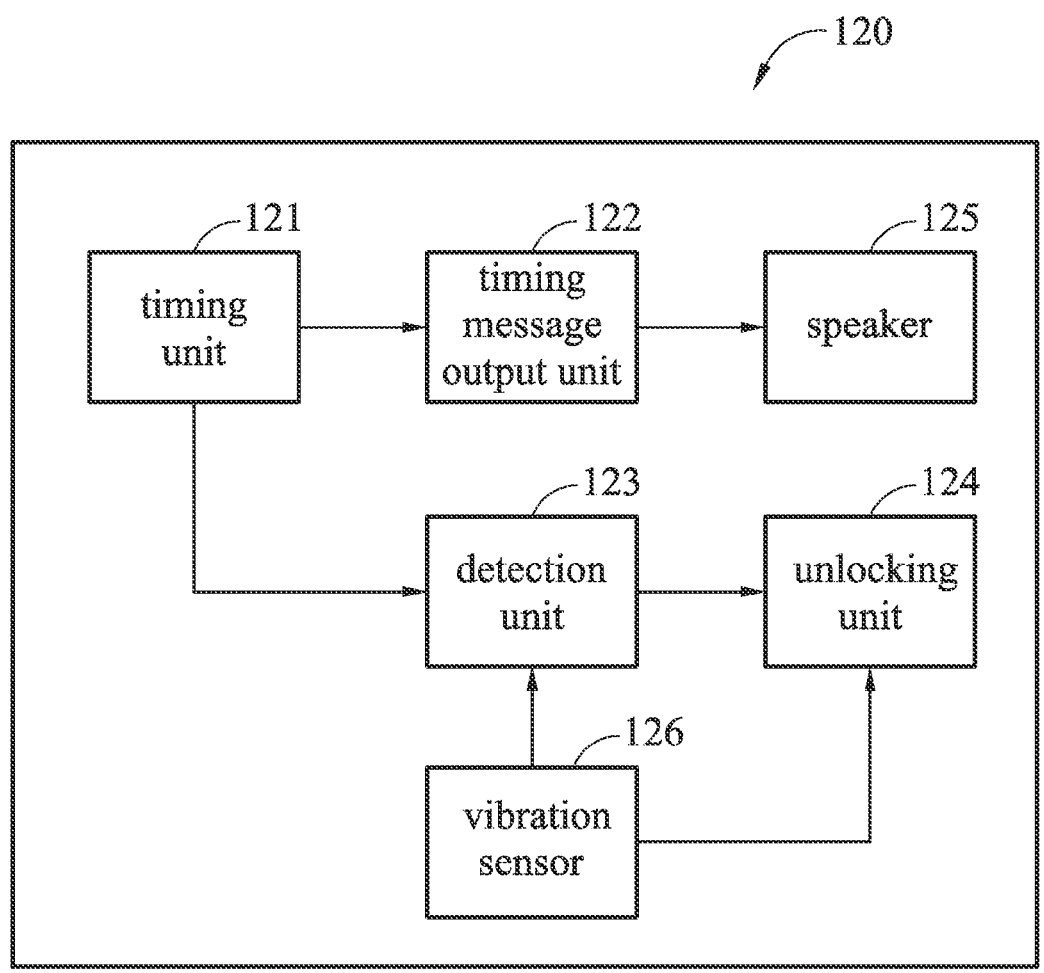
FIG. 12 is a block diagram of an unlocking device according to a third embodiment of the invention.

Please refer to FIG. 12, showing a block diagram of an unlocking device according to a third embodiment of the invention. In the embodiment, the device 120 is a wearable device such as a pair of smart goggles or a smart watch, which is not suitable for displaying the unlocking interface and the unlocking password due to a display being unavailable or the display size being too small. The device 120 includes a timing unit 121, a timing message output unit 122, a detection unit 123, and an unlocking unit 124. In addition, the device 120 further includes a speaker 125 and a vibration sensor 126.

The timing unit 121 is configured to perform a timing operation in response to the input pre-unlocking operation. The timing message output unit 122 is configured to control the speaker 125 to output a sound according to the predefined frequency to determine the current-time message during the timing unit 121 is performing the timing operation. In another implementation, the current-time message may be a vibration. The vibration sensor 126 is configured to receive a hit input by the user. The detection unit 123 is configured to detect the hit received by the vibration sensor 126 to detect an operation input by the user. The unlocking unit 124 is configured to determine whether the duration of time between the timing unit 121 starting the timing operation and the hit being input is equal to a predefined interval, and to unlock the device when they are the same.

The time message may be a real physical time or a time information represented by the input message content, details for which are provided as follows.

In the embodiments of the invention, the time message may be a sound or a vibration, and the timing message output unit 122 outputs the current-time message according to a predefined frequency during the timing unit 121 is performing the timing operation. The predefined frequency may be defaulted by the device system or predefined by the user. For example, a sound is output every 1 second, and the user may determine the current time is 5 seconds based on the sound is repeated 5 times. The time message may adopt the vibration and image in place of the sound based on the same principle.

Figure 13:
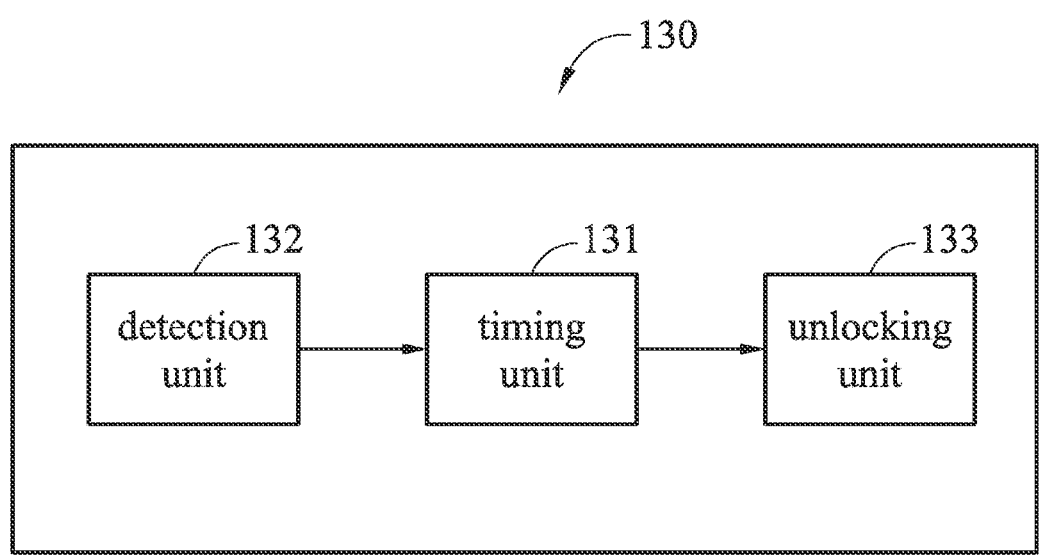
FIG. 13 is a block diagram of an unlocking device according to a fourth embodiment of the invention.

Please refer to FIG. 13, showing a block diagram of an unlocking device according to a fourth embodiment of the invention. The device 130 includes a timing unit 131, a detection unit 132, and an unlocking unit 133.

The detection unit 132 is configured to perform a timing operation in response to the input pre-unlocking operation, and to detect at least one input unlocking operation.

The pre-unlocking operation is a predefined operation entered into an unlocking device, e.g., triggering a power-up button of the device. The unlocking operation may be any user input operation, or a predefined operation. In addition, the pre-unlocking operation is different from the unlocking operation.

The timing unit 131 is configured to time the lasting time of the unlocking operation detected by the detection unit 132.

The unlocking unit 133 is configured to determine whether the lasting time of the unlocking operation generated by the timing unit 131 is equal to a predefined interval, and unlock the device when they are the same.

The predefined interval is indicated by a password predefined by the user.

The unlocking device in the embodiment may be applied in an electronic apparatus which has a display or a touch panel. The unlocking device performs a corresponding operation to the electronic apparatus through the current-time message shown (such as pressing a button or hitting the screen) to unlock a screen lock. In another embodiment, the unlocking device may be applied to a wearable electronic device, and outputs the current-time message in the form of a sound or a vibration to perform a corresponding operation for unlocking the wearable electronic device.

An unlocking methods and an unlocking device utilized the method are provided in the embodiments. The unlocking method includes performing a timing operation when receiving an input pre-unlocking operation, determining if the duration between when the timing operation starts and when the unlocking operation is entered is equal to a predefined interval (password) upon detecting the entered unlocking operation, or determining whether the unlocking operation has been lasting for a predefined interval, and unlocking the device when they are the same. The unlocking method and the unlocking device provide a time-based unlocking scheme by configuring the unlocking password as a time interval, thus the password is not limited to the availability of a display, and may be applied to various apparatuses and in various scenarios.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A time-based unlocking method for unlocking a device, comprising:
performing a timing operation in response to an input pre-unlocking operation;
detecting at least one input unlocking operation;
wherein a password for unlocking the device includes
N numbers of sequentially configured sub-passwords, and each sub-password indicates a predefined interval; and
the unlocking method further comprises:
determining whether a time interval between a current unlocking operation and a previous unlocking operation is equal to a corresponding predefined interval which is indicated by a corresponding sub-password;
if the time interval between the current unlocking operation and the previous unlocking operation is equal to the corresponding predefined interval, confirming that a sub-password has been entered;
determining whether the N numbers of sub-passwords have been entered;
when the N numbers of sub-passwords have been entered, unlocking the device;
when the N numbers of sub-passwords have not been completely entered, performing another timing operation after one sub-password has been entered and continuing detecting the unlocking operation; and
repeating the above steps until the N numbers of sub-passwords have been entered.

2. The time-based unlocking method of claim 1, wherein after the step of performing a timing operation in response to an input pre-unlocking operation, the unlocking method further comprises:
outputting a current-time message to indicate the time interval from the start of the timing operation to the input unlocking operation.

3. The time-based unlocking method of claim 2, wherein the current-time message includes a sound, a vibration, or an image; and the outputting step comprises:
during the timing operation, outputting the current-time message based on a predetermined frequency.

4. The time-based unlocking method of claim 3, wherein the step of outputting the current-time message based on a predetermined frequency further comprises: rotationally showing 10 numbers ranging from 0 to 9 in an ascending order starting from 0; and determining the current-time message according to the currently shown number and a time of rotations of the currently shown number.

5. The time-based unlocking method of claim 3, wherein the step of outputting the current-time message based on a predetermined frequency further comprises: displaying symbols including at least two directional arrows when the timing operation is started, and controlling the at least two directional arrows highlighted rotating in a clockwise or anti-clockwise order based on the predetermined frequency during the timing operation; and determining the current-time message according to a currently highlighting directional arrow and a time of rotations of the currently highlighting directional arrow.

6. The time-based unlocking method of claim 1, wherein before the step of detecting at least one input unlocking operation, the unlocking method further comprises:

detecting the input pre-unlocking operation for a locked device;

when the input pre-unlocking operation for the locked device is detected, initiating the timing operation;

determining whether the pre-unlocking operation has been lasting for a predefined period; and if the pre-unlocking operation has been lasting for the predefined period, performing another timing operation.

7. The time-based unlocking method of claim 1, wherein the unlocking operation comprises at least one of a touch operation, a voice input, a keypad input and a fingerprint input, and the pre-unlocking operation comprises at least one of a touch operation, a voice input, a keypad input and a fingerprint input.

8. The time-based unlocking method of claim 1, wherein the unlocking operation is different from the pre-unlocking operation.

9. A time-based unlocking method for unlocking a device, comprising:

entering an unlocking mode in response to an input pre-unlocking operation;

detecting at least one input unlocking operation;

wherein a password for unlocking the device includes N numbers of sequentially configured sub-passwords, and each sub-password corresponds to a predefined interval;

the unlocking method further comprises:

determining whether each of the lasting time of the at least one input unlocking operation is equal to each of predefined intervals which is indicated by a corresponding sub-password;

if each of the lasting time of the at least one input unlocking operation is equal to each of predefined intervals; confirming that a corresponding sub-password has been entered;

determining whether the N numbers of sub-passwords have been entered;

when the N numbers of sub-passwords have been entered, unlocking the device;

when the N numbers of sub-passwords have not been completely entered, performing another timing operation after one sub-password has been entered and continuing detecting the unlocking operation; and repeating the above steps until the N numbers of sub-passwords have been entered.

10. The time-based unlocking method of claim 9, wherein after the step of detecting at least one input unlocking operation, the unlocking method further comprises:

initiating the timing operation when detect the at least one input unlocking operation, and outputting a timing message generated in the timing operation to indicate the lasting time of the unlocking operation.

11. A time-based unlocking device, comprising:

a timing unit, in response to an input pre-unlocking operation, configured to perform a timing operation;

a detection unit, configured to detect at least one input unlocking operation;

wherein a password for unlocking the device includes N numbers of sequentially configured sub-passwords, and each sub-password indicates a predefined interval; and the time-based unlocking device further comprises:

an unlocking unit, configured to determine whether a time interval between a current unlocking operation and a previous unlocking operation is equal to a corresponding predefined interval which is indicated by a corresponding sub-password; if the time interval between the current unlocking operation and the previous unlocking operation is equal to the corresponding predefined interval, confirming that a sub-password has been entered; determining whether the N numbers of sub-passwords have been entered; when the N numbers of sub-passwords have been entered, unlocking the device; when the N numbers of sub-passwords have not been completely entered, performing another timing operation after one sub-password has been entered and continuing detecting the unlocking operation; and repeating the above steps until the N numbers of sub-passwords have been entered.

12. The time-based unlocking device of claim 11, further comprises:

a timing message output unit, configured to output a current-time message;

a speaker, controlled by the timing message output unit, output a sound according to the predefined frequency to determine the current-time message is performing the timing operation.

13. A time-based unlocking device, comprising:

a detection unit, configured to enter an unlocking mode in response to an input pre-unlocking operation, and detect an input unlocking operation;

a timing unit, configured to perform a timing operation to an lasting time of the input unlocking operation detected by the detection unit;

wherein a password for unlocking the device includes N numbers of sequentially configured sub-passwords, and each sub-password corresponds to a predefined interval; and an unlocking unit, configured to determine whether each of the lasting time of the at least one input unlocking operation is equal to each of predefined intervals which is indicated by a corresponding sub-password; if each of the lasting time of the at least one input unlocking operation is equal to each of predefined intervals; confirming that a corresponding sub-password has been entered; determining whether the N numbers of sub-passwords have been entered; when the N numbers of sub-passwords have been entered, unlocking the device; when the N numbers of sub-passwords have not been completely entered, performing another timing operation after one sub-password has been entered and continuing detecting the unlocking operation; and repeating the above steps until the N numbers of sub-passwords have been entered.

14. The time-based unlocking device of claim 13, further comprises:

a timing message output unit, configured to output a current-time message;

a speaker, controlled by the timing message output unit, output a sound according to the predefined frequency to determine the current-time message is performing the timing operation.

* * * * *